US011001107B2

United States Patent
Gonzaga et al.

(10) Patent No.: US 11,001,107 B2
(45) Date of Patent: May 11, 2021

(54) DEVICE FOR ASSEMBLING-DISASSEMBLING A SUPPORT RING IN OR FROM A TYRE, AS WELL AS MACHINE COMPRISING SUCH A DEVICE

(71) Applicant: Butler Engineering and Marketing S.p.A., Rolo (IT)

(72) Inventors: Tullio Gonzaga, Correggio (IT); Silvano Santi, Imola (IT)

(73) Assignee: BUTLER ENGINEERING AND MARKETING S.P.A., Rolo (IT)

( * ) Notice: Subject to any disclaimer, the term of this patent is extended or adjusted under 35 U.S.C. 154(b) by 308 days.

(21) Appl. No.: 15/270,398

(22) Filed: Sep. 20, 2016

(65) Prior Publication Data

US 2017/0080763 A1 Mar. 23, 2017

(30) Foreign Application Priority Data

Sep. 21, 2015 (IT) .......................... 102015000053623

(51) Int. Cl.
*B60C 25/05* (2006.01)
*B60C 25/14* (2006.01)

(52) U.S. Cl.
CPC .......... *B60C 25/0509* (2013.01); *B60C 25/05* (2013.01); *B60C 25/142* (2013.01)

(58) Field of Classification Search
CPC ... B23P 19/047; B60C 25/0509; B60C 25/05; B60C 25/0521; B60C 25/132; B60C 25/142

USPC .......................................................... 157/1
See application file for complete search history.

(56) References Cited

U.S. PATENT DOCUMENTS

| 4,251,906 | A | 2/1981 | Jacquemin | |
|---|---|---|---|---|
| 7,341,090 | B2 * | 3/2008 | Gonzaga | B60C 25/138 157/1.17 |
| 9,919,424 | B1 * | 3/2018 | Devengenzo | B25J 15/02 |
| 2003/0150565 | A1 * | 8/2003 | Gonzaga | B60C 25/125 157/1.28 |
| 2010/0232916 | A1 * | 9/2010 | Tullio | B60C 25/138 414/279 |
| 2011/0048650 | A1 * | 3/2011 | Lawson | B25J 15/0028 157/16 |

FOREIGN PATENT DOCUMENTS

| CA | 1223515 | 6/1987 | | |
|---|---|---|---|---|
| DE | 102005045159 | 3/2007 | | |
| DE | 102007062980 A1 * | 7/2008 | ........... | B60C 25/135 |
| EP | 1354730 | 10/2003 | | |

OTHER PUBLICATIONS

Machine Translation of DE 10 2007 062 980 A1 (Year: 2008).*

* cited by examiner

*Primary Examiner* — Christopher J Besler
(74) *Attorney, Agent, or Firm* — Tutunjian & Bitetto, P.C.

(57) ABSTRACT

The present invention regards a device for assembling and/or disassembling a support ring (SR) within or from a tyre (T), such device including a base, a column or pillar rising from said base and a grip and release group and/or an extraction group.

19 Claims, 7 Drawing Sheets

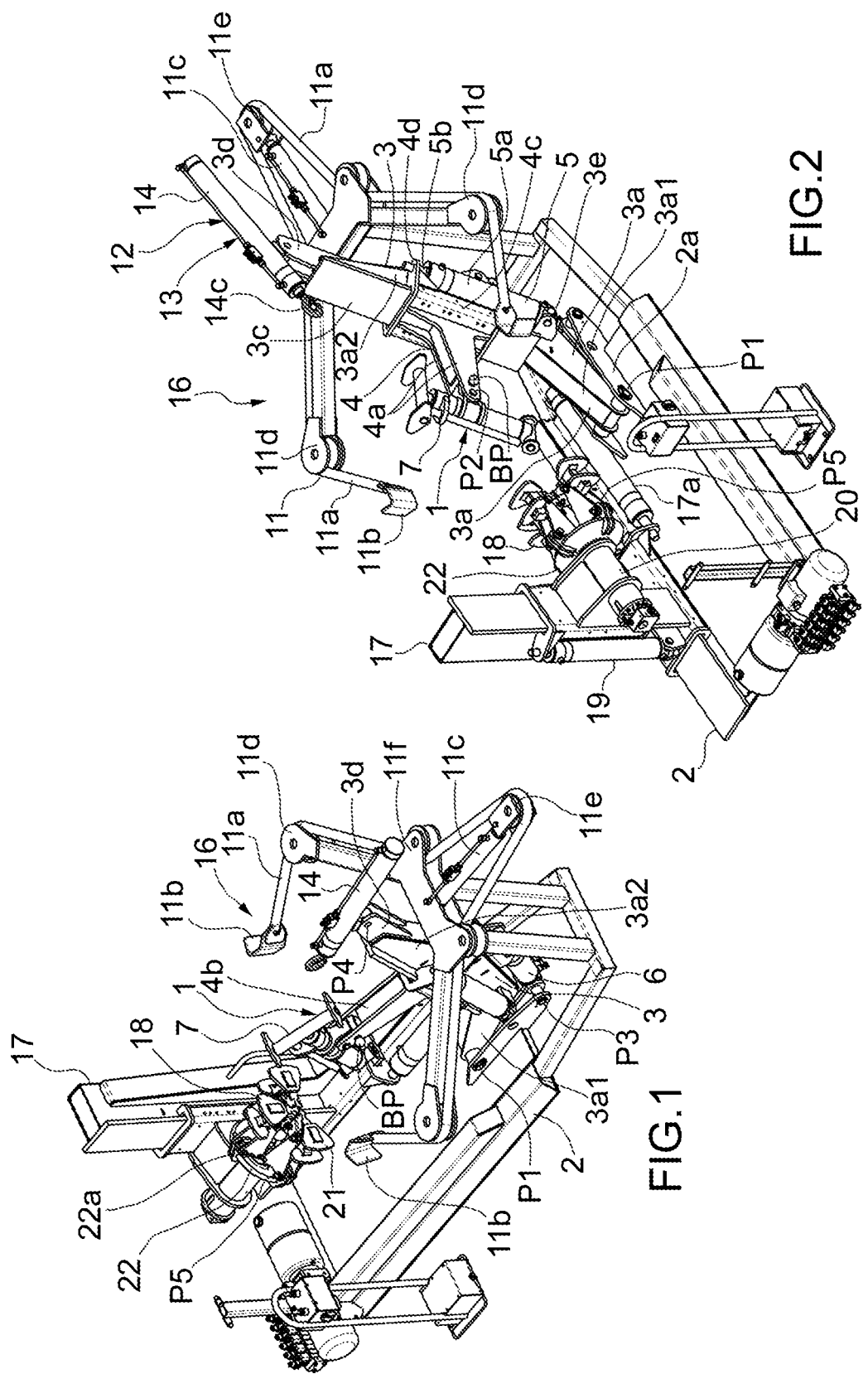

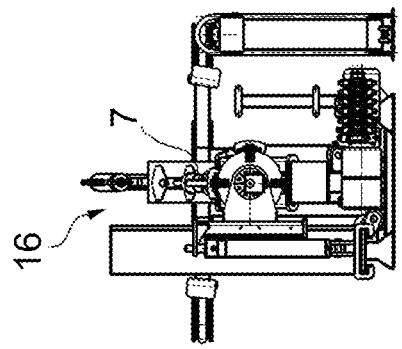
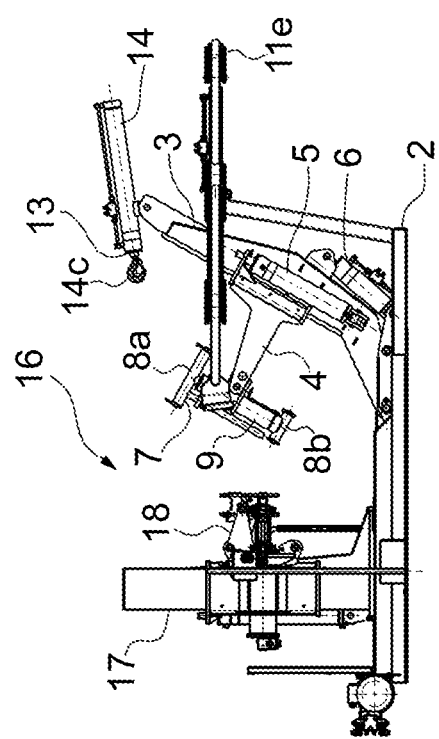
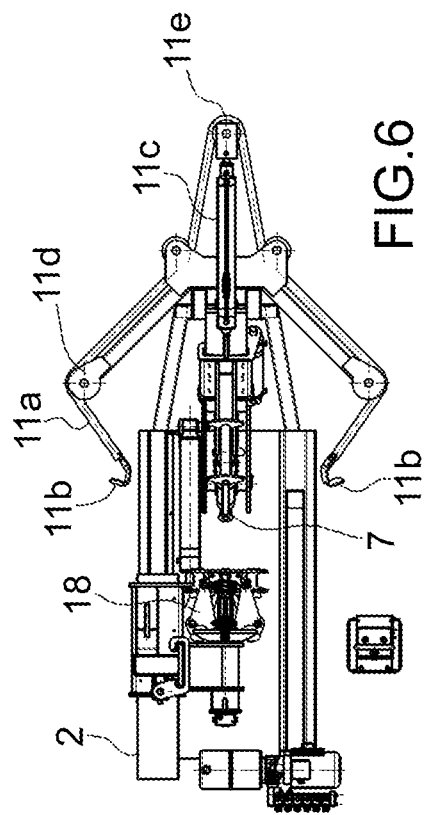
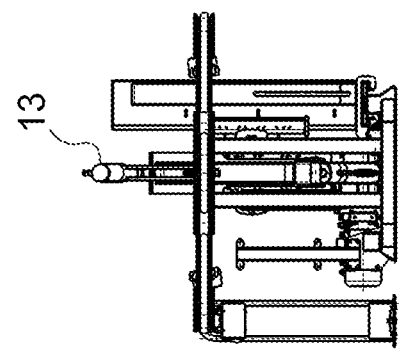

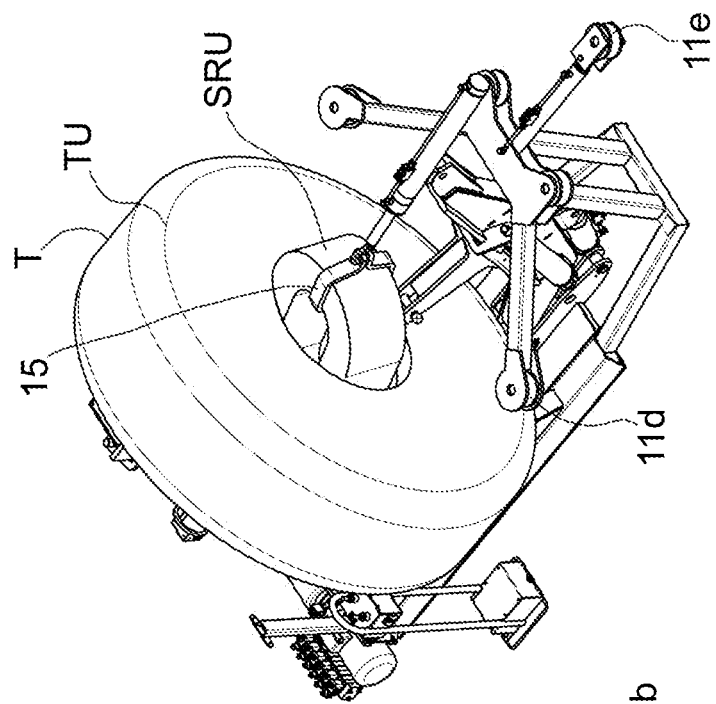
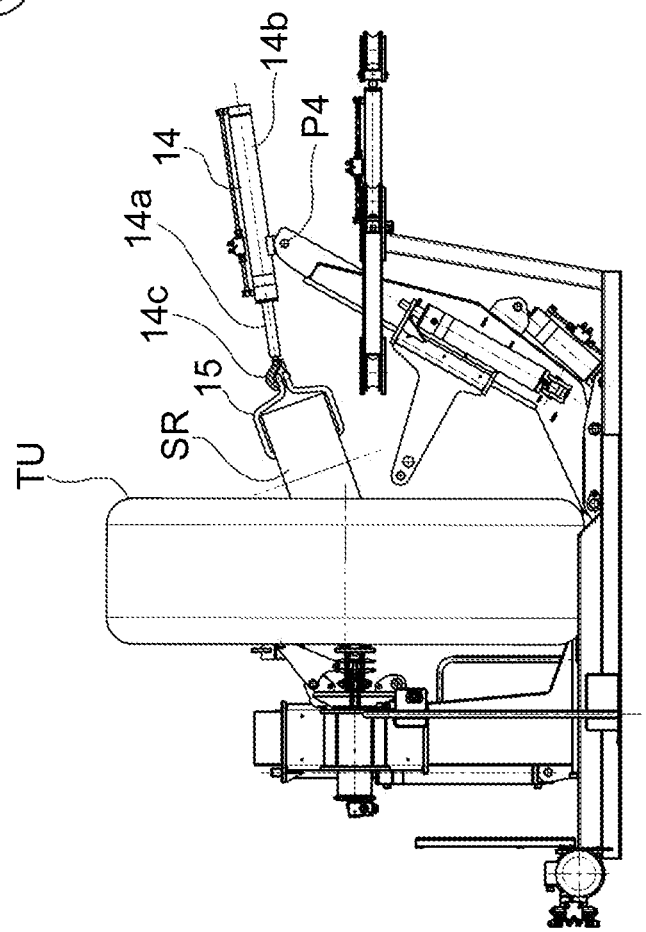
FIG.20
FIG.19

DEVICE FOR ASSEMBLING-DISASSEMBLING A SUPPORT RING IN OR FROM A TYRE, AS WELL AS MACHINE COMPRISING SUCH A DEVICE

TECHNICAL FIELD OF THE INVENTION

The present invention regards a device for assembling and/or a device for disassembling an annular element or support ring in or from a tyre, a machine provided with such device(s) as well as a method for assembling and/or disassembling a support ring.

The present invention is in particular relative to a device for assembling and/or a device for disassembling a support ring in or from a tyre for wheels of military vehicles, public transportation vehicles or vehicles for transporting people in safe conditions, in which the support ring is capable of supporting and allowing the advancement of the respective vehicle even in the case of breakage or perforation of the tyre or is set to ensure the correct maintenance in position of the tyre with respect to the rim.

STATE OF THE PRIOR ART

Some vehicles, such as in particular military vehicles, are often provided with wheels with a rigid support ring, usually made of plastic, arranged in the housing zone delimited between the tyre and the rim.

If the tyre should be perforated, the rigid support ring would be able to suitable support the vehicle for a specific time period, and allow the advancing thereof even on rough terrain and at a speed that is in any case satisfactory before the substitution or repair of the tyre.

The support rings are usually assembled and disassembled manually by multiple operators and by means of levers or in any case specific tools and the assembly-disassembly times are several hours long, which involves considerable difficulties, in particular when it is necessary to substitute a support ring of a wheel of a military vehicle positioned or acting in a battle or reconnaissance zone.

There is therefore the need to provide solutions capable of reducing the times and difficulty of assembly and disassembly of the aforesaid support rings.

U.S. Pat. No. 4,251,906A, CA1223515A, DE102005045159A1 and EP1354730A1 teach respective solutions according to the state of the prior art.

SUMMARY OF THE INVENTION

The main object of the present invention is to provide a new device for assembling and/or disassembling an annular element or support ring in and from tyres.

Another object of the present invention is to provide a device for assembling and/or disassembling an annular element or support ring which allows an effective and quick assembly and/or disassembly of such component.

Another object of the present invention is to provide a machine and a method for assembling and/or disassembling a support ring.

In accordance with one aspect of the invention, a device according to the present specification is provided.

In accordance with another aspect of the invention, a machine is provided according to the present specification.

In accordance with another aspect of the invention, a method is provided according to the present specification.

The present specification refers to preferred and advantageous embodiments of the invention.

BRIEF DESCRIPTION OF THE DRAWINGS

Other characteristics and advantages of the invention will be clearer from the description of one embodiment of a device for assembling, of a device for disassembling and of a machine, illustrated by way of example in the enclosed drawings in which:

FIGS. 1 and 2 are perspective views, from respective sides of a machine according to the present invention;

FIGS. 3 to 6 are respectively front, side, rear and plan views of the machine of FIG. 1;

FIGS. 19 and 20 illustrate respective steps of a method for disassembling according to the present invention of a support ring from a tyre.

In the set of drawings, equivalent parts or components are marked with the same reference numbers.

DETAILED DESCRIPTION OF THE INVENTION

It is first of all confirmed that the devices, the machine and the methods according to the present invention are relative to the assembly or to the disassembly of a support ring SR in or from a tyre T or better yet in or from an inner channel IC of a tyre T, in particular a tyre for wheels of military vehicles, public transportation vehicles or vehicles for transporting people in safe conditions, in which the support ring SR is capable of supporting and allowing the advancement of the respective vehicle even in the case of breakage or perforation of the tyre or it is set to ensure the correct maintenance in position of the tyre or better yet of the respective circumferential beads with respect to the rim.

With reference to the enclosed figures, a device 1 is illustrated for assembling an annular element or support ring SR within a tyre T, comprising a base 2, a first column or pillar 3 rising from the base 2 as well as a support arm 4 mounted, preferably slidably, on the column 3. The arm is extended transversely or orthogonally with respect to the column 3 or at least with respect to a second section of the column that is vertical or slightly tilted with respect to the vertical.

Figure 9:
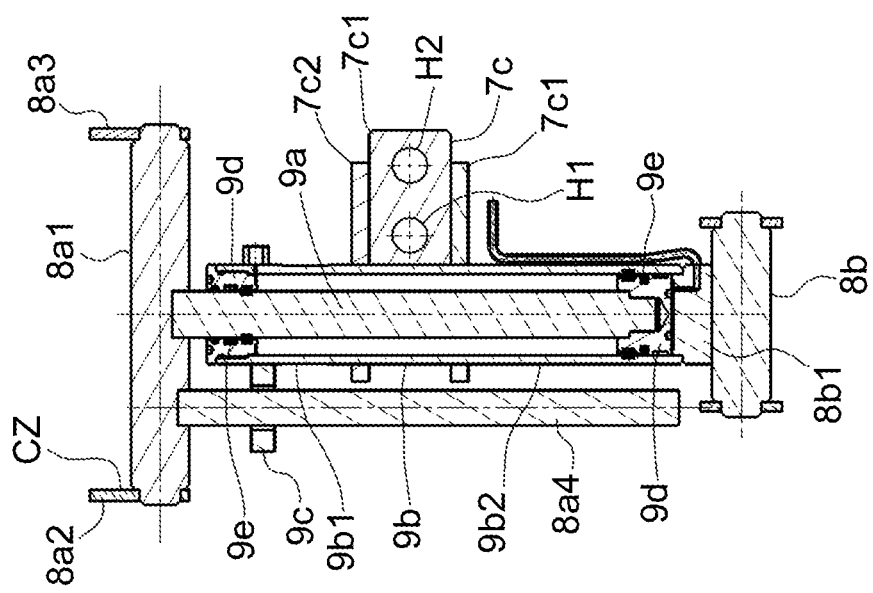
FIG. 9 is a view taken in section along the trace IX-IX of FIG. 8.
Figure 8:
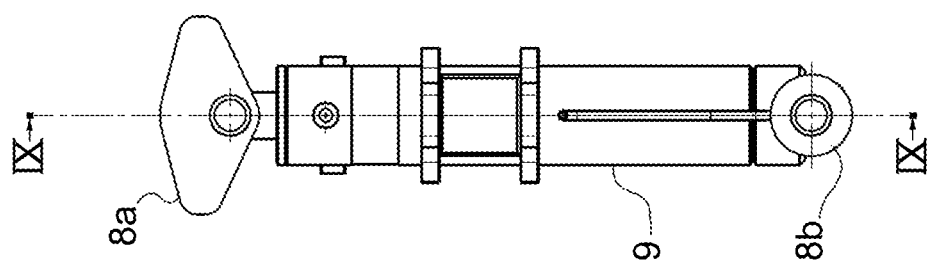
FIGS. 7 and 8 are a front view and a side view of a group for gripping and releasing a device according to the present invention.
Figure 7:
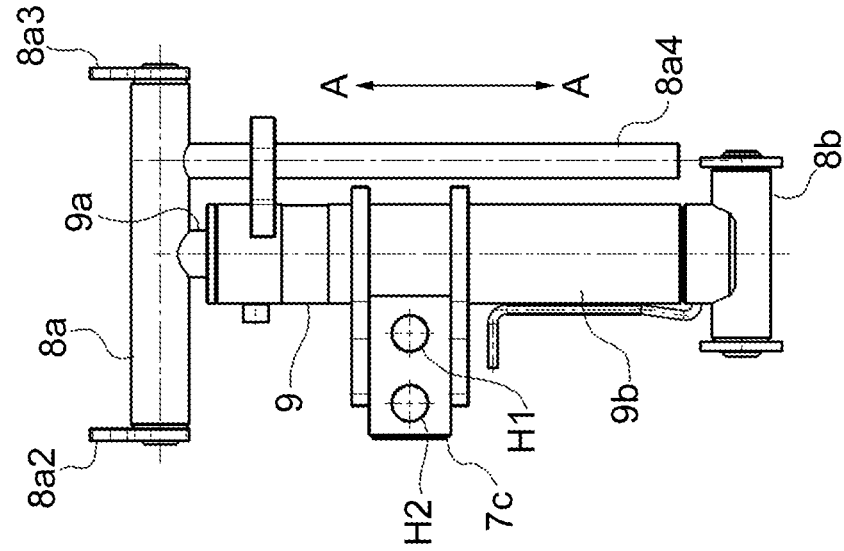
Figure 12:
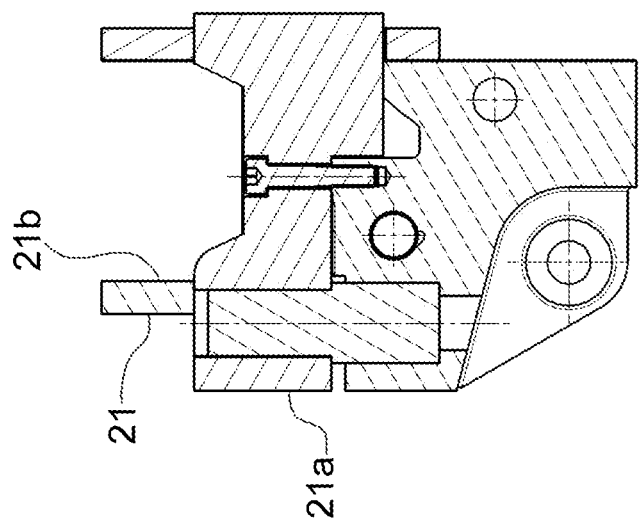
FIG. 12 is a view taken in section along the trace XII-XII of FIG. 10.
Figure 11:
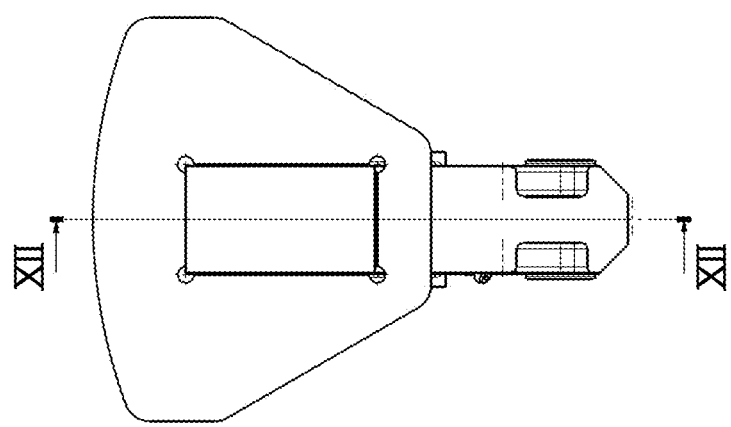
FIGS. 10 and 11 are a front view and a side view of a claw of a device according to the present invention.
Figure 10:
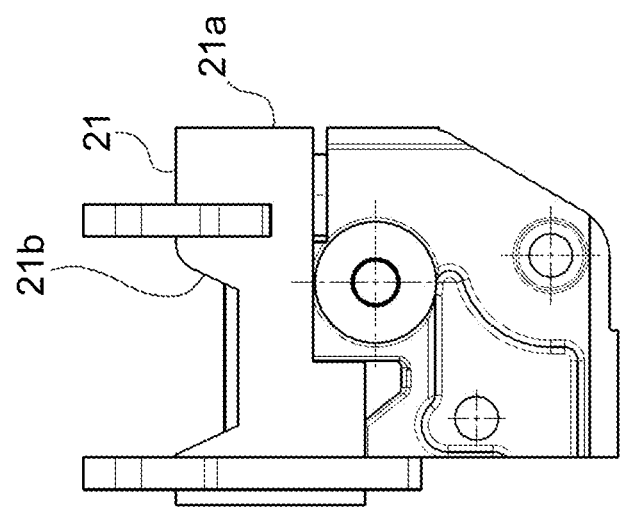
Figure 14:
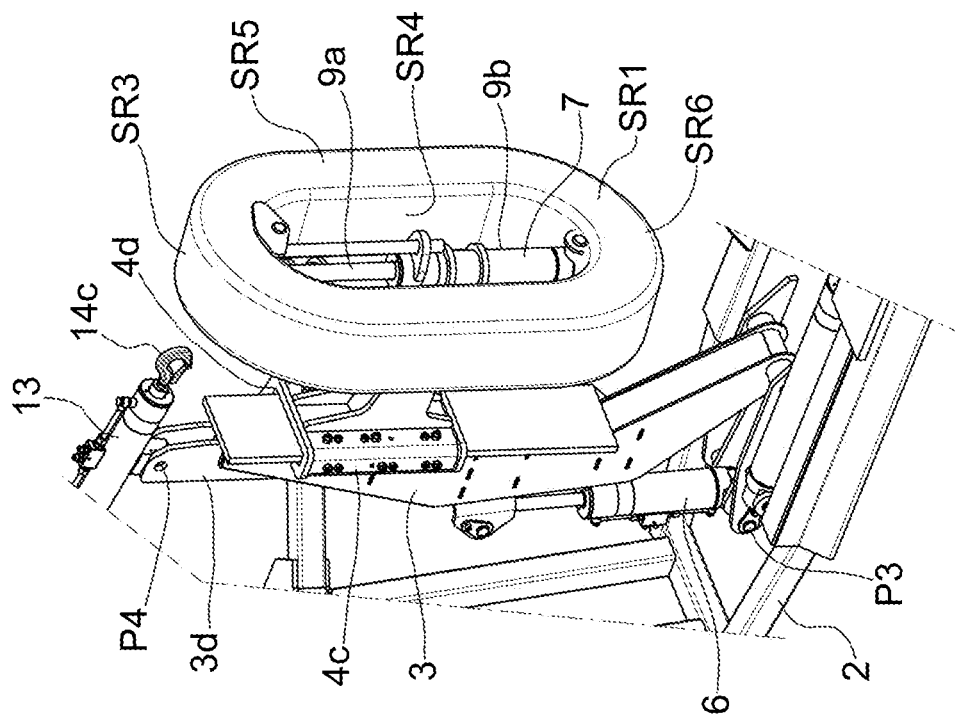
FIGS. 13 and 14 illustrate an assembly device according to the present invention in respective operative positions together with a support ring to be mounted in a tyre.
Figure 13:
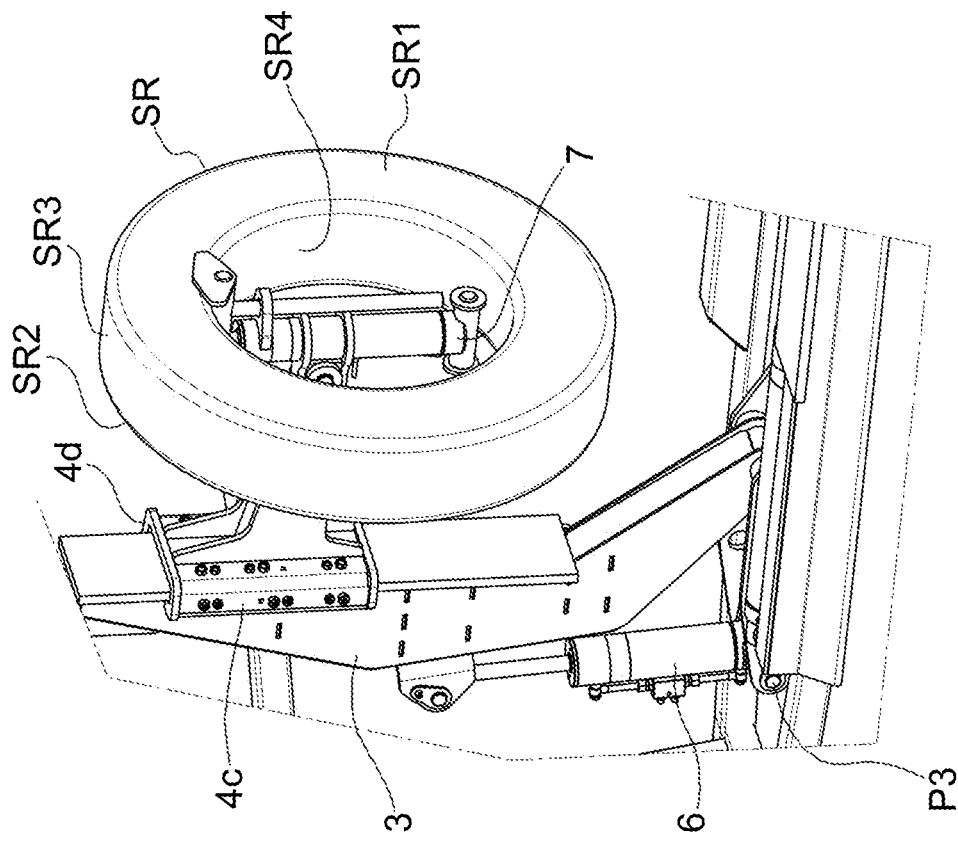
Figure 15:
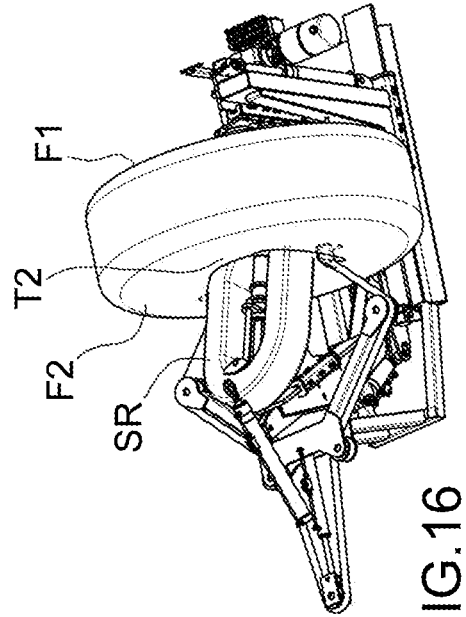
FIGS. 15 to 18 illustrate respective steps of a method for assembling according to the present invention of a support ring in a tyre.
Figure 16:
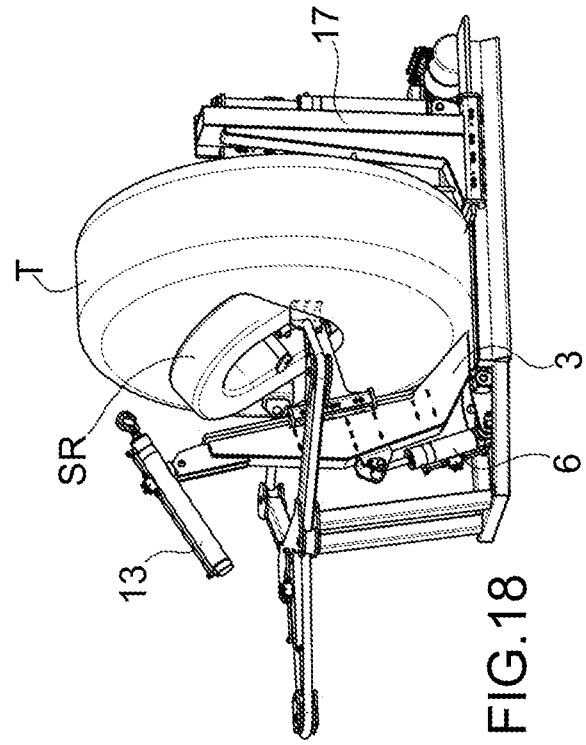
Figure 17:
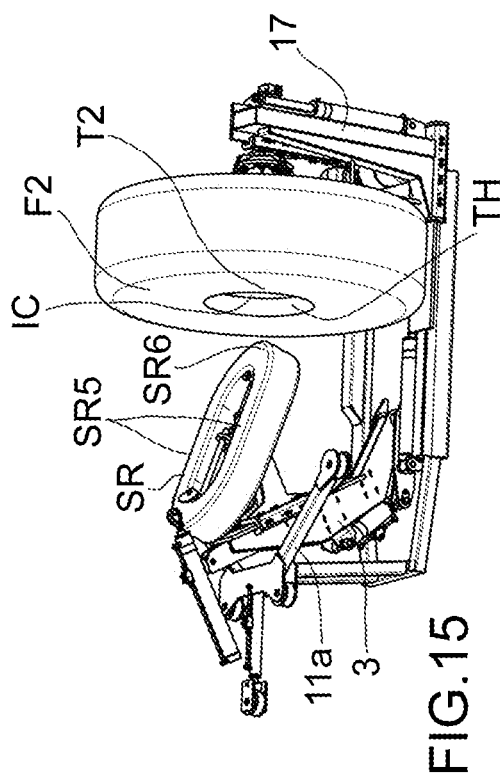
Figure 18:
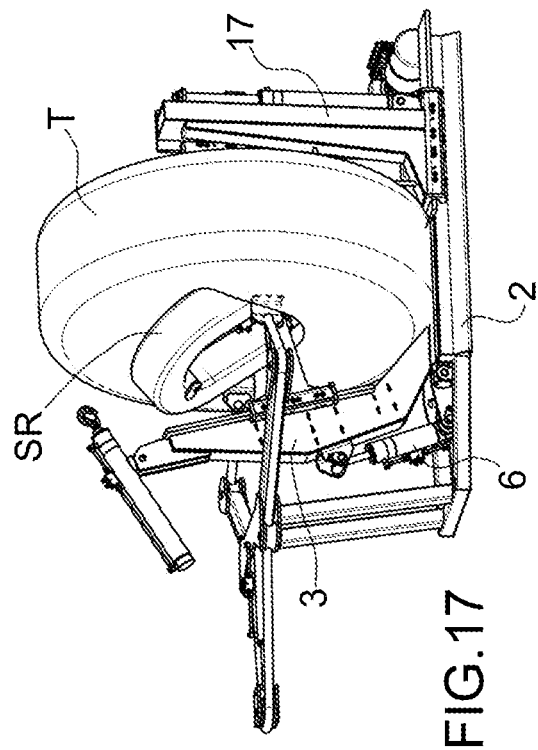

The support ring SR is mounted in the tyre T, or better yet in an inner channel IC thereof, before mounting the tyre on a rim and, as stated above, it is able to support and allow the advancing of the respective vehicle even in the case of breakage or perforation of the tyre or it is set to ensure the correct maintenance in position of the tyre with respect to the rim. Such ring SR usually has (see in particular FIGS. 13 and 14) two main annular walls SR1, SR2 connected by means of a substantially tubular lateral wall SR3. In addition, the ring SR is made of a rigid material, such as plastic, if desired with metal reinforcement elements embedded in a plastic matrix, but in any case deformable, in particular elastically deformable as will be better described hereinbelow.

According to the non-limiting embodiment illustrated in the figures, the column 3 includes a main body, for example including a pair of plates 3a, if desired L-shaped, substantially parallel to each other and a table 3c from which the two plates 3a are extended. The main body 3a is connected and, preferably, pivoted to the base 2 or to one or to a pair of brackets 2a, if desired with substantially vertical trim, of the base 2; preferably, the column 3 is pivoted to the base 2, if desired around a substantially horizontal pivot axis, if desired by means of a first pin P1 and then means are provided for angularly moving the column 3 around the pivot axis, e.g. a first actuator 6, if desired pneumatic, electric, hydraulic or oil hydraulic, with one component, e.g. the cylinder, connected, if desired fixed or pivoted around a third pin P3 to the base 2 and another component, e.g. a stem, slidably mounted within the respective cylinder and connected, if desired pivoted or fixed to the column 3, or, if provided, to one of the plates 3a thereof.

More particularly, the column 3 has a first section 3a1 pivoted to the base 2 at a first end thereof and, in use, substantially horizontal or slightly tilted with respect to the horizontal, e.g. about 10°-30° with respect to the horizontal, and then a second section 3a2 rising from the first section 3a1 or better yet from a second end of the first section and, in use, substantially vertical or slightly tilted with respect to the vertical, e.g. about 10°-40° with respect to the vertical and such to delimit an acute angle with the first section 3a1.

Still according to the non-limiting embodiment illustrated in the figures, the arm 4 comprises one or a pair of plates 4a, if desired connected to each other as a bridge, e.g. by means of one or a pair of gusset components 4b. The plates 4a then rise upward from a slide component 4c slidably mounted on the column 3, and such slide component 4c can comprise a U-shaped section mounted so as to slide on and enclose the column 3, or, if provided, the table 3c and the two plates 3a thereof.

The device is then provided with means for dislocating the support arm 4 along the column 3, which for example comprise a second actuator 5, if desired pneumatic, electric, hydraulic or oil hydraulic, with one component, e.g. the cylinder, connected, if desired pivoted to the column 3 and another component, e.g. a stem, connected, if desired pivoted to the arm 4. More particularly, according to the non-limiting embodiment illustrated in figure, the actuator 5 comprises a cylinder 5a pivoted to the column 3, if desired to two tabs 3e, e.g. substantially parallel to each other, rising from the main body 3a thereof, as well as a stem 5b slidably mounted within the cylinder 5a and with one end connected to the arm, e.g. fitted within a portion, e.g. flanged 4d, of the slide component 4c.

The device also comprises a group 7 for gripping and releasing a support ring SR articulated to the support arm 4 in order to be angularly movable or oscillating with respect thereto. The grip and release group 7 (see in particular FIGS. 7 to 9, 13 and 14) include two engagement ends 8a, 8b of respective portions of the support ring SR as well as means for approaching and moving apart 9 the engagement ends 8a, 8b along a direction of elongation-shortening A-A between at least one first engagement position (see FIG. 13), wherein the group is able to stretch a support ring SR along the direction A-A so as to impart to the ring SR a substantially elongated or ellipsoidal configuration and a second release position for a support ring SR, wherein the engagement ends 8a, 8b are close to each other and at a distance less than the diameter or section of the opening SR4 delimited by the support ring SR, such that it is possible to insert or remove the grip and release group 7 into or from the support ring SR. In addition, in an intermediate position, the ends 8a and 8b are at a distance substantially equal to the diameter or section of the opening SR4 delimited by the support ring SR and hence they engage the latter from the interior, without deforming it (see FIG. 14). The means for approaching and moving apart for example comprise a third actuator 9, if desired pneumatic, electric, hydraulic or oil hydraulic, with one component, e.g. the stem 9a, connected, if desired fixed or integral with one end 8a, and another component, e.g. a cylinder 9b in which the stem 9a is slidably mounted, connected, if desired fixed or integral with the other 8b.

If desired, the grip and release group 7 can be articulated to the support arm 4 such that it can be disassembled therefrom or overturned, so as to reduce the bulk and not obstruct the possible action of an extraction group which will be described hereinbelow.

More particularly, according to the non-limiting embodiment illustrated in figure, a first end 8a of the engagement ends is substantially C-shaped or V-shaped and is intended to be inserted and wrap, starting from the interior, i.e. starting from the internal edge of delimitation of the central hole SR4 of a support ring SR, a respective portion of the sides thereof. For such purpose, the first end 8a can have a bar component 8a1 fixed to or integral with a component of the actuator 9, e.g. with the stem 9a, and a pair of plates 8a2, 8a3, if desired parallel to each other, each fixed, if desired by means of a bolt or a screw, to a respective end of the bar component 8a1, so as to delimit therewith a cradle zone CZ, e.g. substantially U-shaped. If desired, one of the plates can have width slightly greater than the bar component 8a1, but less than the other plate so as to allow easily engaging support rings with size (in particular thickness) even quite different from each other. The first end 8a can then comprise a guide rod 8a4 slidably mounted, if desired with clearance, within a hole delimited by a shelf component 9c rising from the actuator 9, e.g. from the cylinder 8b thereof. The guide rod 8a4 is, in use, substantially parallel to the stem 9a of the third actuator 9 or better yet to the direction of insertion-removal of the stem into-from the cylinder 9b.

The second end 8b of the engagement ends has smaller length than the first end 8a and is such to be abutted against or engage an internal portion of the support ring SR distal from the portion engaged by the first end 8a. The second end 8b can then have a block section 8b1 fitted within one end of the cylinder 9b.

The third actuator 9 can then be provided with bushes 9d for closing respective ends of the cylinder 9b as well as gaskets or seals 9e arranged between the cylinder 9b and the bushes 9d.

In substance, the grip and release group 7 comprises a substantially elongated intermediate section constituted by the actuator 9 and the two engagement ends 8a, 8b, defining a substantially T-shaped configuration therewith, with the first end 8a extended transversely or better yet orthogonally with respect to the actuator 9 or to the direction of elongation-shortening A-A, or double T-shaped configuration, with both the engagement ends 8a, 8b extended transversely or better yet orthogonally with respect to the actuator 9 or to the direction of elongation-shortening A-A.

More particularly, the grip and release group 7 is articulated to the arm 4 at an intermediate portion thereof or better yet, according to the embodiment illustrated in the figures, according to an intermediate portion of the stem 9b of the actuator 9, such that it has a first section 9b1 between the first end 8a and point or zone of pivoting to the arm 4 and a second section 9b2 between the second end 8b and point or zone of pivoting to the arm 4.

Preferably, the grip and release group 7 is articulated or pivoted to the arm 4 so as to be angularly movable, in use or during the assembly of the support ring SR, with respect to the arm 4 as a function of or better yet only as a function of the reaction force imparted to the grip and release group 7 by the support ring SR. More particularly, the grip and release group 7 is articulated to the arm 4 so as to be angularly movable, in use or during the assembly of the support ring SR, with respect to the arm 4 as a function of the reaction force imparted to the grip and release group 7 by the support ring SR during the insertion of a tyre T into the inner channel IC, while driving or controlling the movement of the arm 4 with respect to the column 3 and/or of the column 3 with respect to the base 2 and/or while driving the movement of a support group, as will be better explained hereinbelow, of the tyre.

For such purpose, the grip and release group 7 can have a shank portion 7c intended to be connected or better yet pivoted by means of a second pin P2 to the arm 4. With regard to such aspect, according to the non-limiting embodiment illustrated in figure, the shank portion 7c of the grip and release group 7 comprises a sleeve component 7c1, if desired rising from the cylinder 9b of the third actuator 9, and such sleeve component 7c1 has a first opening or hole H1, preferably through, intended to be aligned with a hole or opening made within the arm 4 for the insertion of the second pin P2, e.g., if provided, within a hole made in one or both plates 4a. If desired, also a second opening or hole H2, preferably through, can be provided, intended to be aligned with a hole or opening made in the arm 4 for the insertion of a blocking pin BP intended to prevent, when fitted, the angular displacement of the grip and release group 7 with respect to the arm 4. If desired, the shank portion 7c also has a pair of brackets 7c2, 7c3 for supporting the sleeve component 7c1, each fixed, if desired welded to the cylinder 9b of the third actuator 9 and enclosing the shank portion 7c1.

If desired, means are also provided for elastic loading, such as springs, for example mounted on an articulation pin, such as the second pin P2, such elastic loading means intended to oppose the angular displacement of the grip and release group 7 with respect to the arm 4; such elastic loading means limit but do not prevent one such angular displacement. In substance, preferably, the device is not provided with active angular displacement means, such as actuators, for the grip and release group 7 with respect to the arm 4.

By driving the angular displacement means 6, the column 3 is angularly moved around the pivot axis between a first trim, in which the grip and release group 7 is distal from the positioning zone of a tyre T and a second trim in which the column and more particularly the second section 3a2 of the same is brought close to the positioning zone of a tyre T, so as to determine the insertion of the grip and release group 7 and hence of the ring SR supported thereby within a central hole TH of the tyre T.

The assembly device can then be provided with means 11 for tensioning a tyre T, which are intended to enlarge the central hole TH delimited by a tyre T in order to facilitate the insertion of the support ring SR. The tensioning means 11 can include at least one rope or chain 11a, one or a pair of constrain components 11b supported at a respective end of the rope or chain 11a and a traction component 11c of the rope or chain 11a, such as a winch or a fifth actuator.

The constrain component 11b can comprise a sheet, preferably metal, suitably bent or shaped, e.g. C-shaped, so as to delimit a zone for the housing and sliding of a respective portion of a bead of a tyre T. In addition, means can be provided for adjustably positioning each sheet with respect to the chain 11a, such as a hook (not illustrated in the figures) connected with the sheet 11b and removably connectable with the eyelets of the chain 11a.

The tensioning means 11 can then be provided with a plurality of pulleys 11d, 11e or the like intended to return the rope(s) or chain(s) 11a. The pulleys 11d can be supported by a support framework 11f, if desired rising from the base 2, which can also support the traction component 11c. For such purpose, one of the pulleys 11e can be movable by means of the traction component or fifth actuator 11c, it too supported by the support frame 11f, so as to vary the tensioning of the rope or chain 11a.

If desired, the fifth actuator 11c can be articulated to the support framework 11f such that it can be disassembled or overturned, so as to reduce the bulk.

According to the non-limiting embodiment illustrated in the figures, a chain 11a is provided, with two constrain components 11b, each connected at a respective end of the chain 11a, even if, as will be understood, the device could be provided with two separate chains, each carrying a constrain component 11b at one end thereof.

Alternatively, the tensioning means 11 could comprise one or more chains or ropes, each movable by means of a respective actuator, hence without providing for pulleys or the like for sending chains or ropes.

In accordance with the present invention, a device is also provided for disassembling 12 a support ring SR from a tyre T and comprising a base 2, a column or pillar 3 rising from the base as well as a group of extraction 13 of an annular element or support ring SR from a tyre T.

The base 2 and the column 3 could be structured as described above with reference to the assembly device 1. In addition, preferably, according to the present invention, an assembly device 1 and a disassembly device 12 are provided, integrated in the same structure, i.e. with the same base 2 and column 3. More in detail, with regard to the extraction group 13, this includes an approach-move apart component 14, such as an extensible-retractable component, which is articulated to the column 3, e.g. at the top of the plates 3a thereof or to one or to a pair of plates 3d constrained, for example by means of bolts, screws or the like to the plates 3a and extended starting from the upper end thereof, so as to be (the approach-move apart component 14) angularly movable or oscillating with respect thereto (the column 3) as well as at least one belt or gripper component 15 (see in particular FIGS. 19 and 20), such as a load belt, such belt or gripper component 15 supported at one constrain end 14c of the approach-move apart component 14 and intended to be wrapped around or enclose a portion of a support ring SR, so as to be able to drag it out of the inner channel IC of a tyre T. For such purpose, the constrain end 14c can be configured as a clasp or hook or be connected or fixed or fixable to a clasp or hook intended to grasp and drag the belt component 15. Alternatively, the constrain end 14c can be configured as a bar on which the belt component 15 is wound.

The belt or gripper component 15 could comprise, for example a belt, a band or a gripper, e.g. a self-tightening gripper. Preferably, the belt or gripper component 15 does not comprise a chain, since such component could ruin or cut the support ring SR.

The approach-move apart component 14 can comprise a stem or inner part or first part 14a of a pneumatic, electric, hydraulic or oil hydraulic actuator or of a telescopic element driven by a pneumatic, electric, hydraulic or oil hydraulic actuator, such stem or inner part or first part 14a movable, if desired insertable-removable, relative to a respective cylinder or outer part or second part 14b of the actuator or of the telescopic element, such cylinder or outer part or second part 14b being articulated, if desired pivoted by means of a fourth pin P4 to the column 3. The constrain end 14c of the approach-move apart component 14 is in such case the free end of the stem 14a.

More particularly, the approach-move apart component 14 is articulated to the column 3 so as to be angularly movable, in use or during the disassembly of the support ring SR, with respect to the column 3 as a function of or better yet only as a function of the reaction force imparted to the belt component 15 by the support ring SR and/or by the tyre T during the removal of the support ring SR from the tyre T.

If desired, elastic loading means are also provided, such as springs, for example mounted on an articulation pin, such as the fourth pin P4, and such elastic loading means are intended to oppose the angular displacement of the approach-move apart component 14 with respect to the column 3; such elastic loading means limit but do not prevent one such angular displacement. In substance, preferably, the device is not provided with active angular displacement means, such as actuators, for the approach-move apart component 14 with respect to the column 3.

In such case, by driving the angular displacement means 6 in one sense, the column 3 is angularly moved around the pivot axis between a first trim, in which the extraction group 13 is distal from the positioning zone of a tyre T and a second trim in which the column and more particularly the second section 3a2 of the same is brought close to the positioning zone of a tyre T, so as to determine the approach of the extraction group 13 and hence of the constrain end 14c to a ring SR within a tyre T. Naturally, by driving the angular displacement means 6 in an opposite sense, the extraction group 13 and hence the ring SR grasped thereby is moved away from the tyre T.

If an assembly-disassembly unit is provided comprising the assembly device 1 and the disassembly device 12, the latter have the same base 2 and the same column 3 and in such case the extraction group 13 is mounted on the column 3 in a position above the grip and release group 7.

In addition, the device for disassembling 12 according to the present invention could also comprise a grip and release group 7, which, as will be better explained hereinbelow, could assist the extraction group 13 during disassembly.

A machine for assembling and/or disassembling 16 an annular element or support ring SR within and/or from a tyre T comprises a device 1 and/or 12 as stated above, a second column 17, if desired rising from the base 2, as well as a support group 18 of a tyre T; such support group 18 is mounted, preferably slidably, on the second column 17 and is movable with respect thereto by means of sliding means, e.g. a fourth actuator 19, if desired pneumatic, electric, hydraulic or oil hydraulic, with one component, e.g. the cylinder, connected, if desired pivoted to the second column 17 and another component, e.g. a stem slidably mounted within the respective cylinder, connected, if desired pivoted or fixed to the support group 18. Preferably, the fourth actuator 19 is set to move the support group 18 in a direction that is vertical or slightly tilted with respect to the vertical.

The second column 17 is preferably slidably mounted on the base 2 and movable with respect thereto by means of activating means, e.g. a sixth actuator 17a, if desired pneumatic, electric, hydraulic or oil hydraulic, with one component, e.g. the cylinder, connected, if desired pivoted to the base 2 and another component, e.g. a stem slidably mounted within the respective cylinder as well as, connected, if desired pivoted to the second column 17. The sliding direction of the second column 17 with respect to the base 2 is parallel to or lying on the longitudinal symmetry axis of the support group and, in use, such to move the support group 18 and hence the tyre T supported thereby close to-away from the column 3.

The support group 18 can comprise claw or gripping or confinement means 21 or the like for engaging and retaining the bead of a tyre T, e.g. two or more claws or grippers 21 if desired substantially C-shaped, so as to define a zone of gripping or support of a tyre, preferably facing upwards and towards the sides of the support group 18, though preferably in a manner such to define a free zone facing the bottom of the support group 18, i.e. lacking claws. With reference to the non-limiting embodiment illustrated in the figures, the support group 18 comprises three claws 21, one with gripping zone facing upward and two with gripping zones facing a respective side of the support group 18.

The claws 21 are articulated or pivoted to a main plate 22 of the support group 18 and means are then provided for actuating the claws 21, such as a motor 20, if desired hydraulic, intended to move the claws 21 between a rest position and a spread apart or angular displacement position, in which the claws 21 are moved away from a longitudinal symmetry axis of the support group 18 or in any case the free ends of the claws 21 are moved away from each other, each thus engaging a respective portion of a bead of the tyre T.

With reference in particular to FIGS. 1, 2 and 10 to 12, each claw 21 comprises a base body 21a pivoted, by means of a respective fifth pin P5, to the main plate 22 or to second plates 22a projecting therefrom. The base body 21a of each claw 21 then delimits a gripping zone 21b, if desired substantially U-shaped for the engagement of a respective portion of a tyre.

If desired, the support group 18 could also be rotatably mounted with respect to a longitudinal symmetry rotation axis.

The support group 18 can for example be supported by a second column 17 rising upward, if desired from the base 2, or alternatively the machine and the device(s) could be separated, and in such case the device or devices could be supported by a base thereof, and when necessary associated or pulled to a machine complete with support group.

Preferably, the support group 18 is arranged with longitudinal symmetry axis substantially horizontal or slightly tilted with respect to the horizontal and in front of the assembly device 1 and/or disassembly device 12, so as to delimit therewith a positioning zone of a tyre T with substantially vertical position.

A machine for treating a tyre T comprising a second column 17 and a support group 18 as indicated above and mounted, preferably slidably on the second column 17, also forms the object of the present invention, independent of the abovementioned devices 1 and 12.

In addition, in the case of assembly device 1, the pivot axis of the grip and release group 7 with respect to the arm 4 is substantially transverse and preferably orthogonal with respect to the longitudinal symmetry axis of the support group 18 and/or to the direction of movement of the column (and hence of the group 18) with respect to the base, while in the case of disassembly device 12, the pivot axis of the approach-move apart component 14 with respect to the column 3 is substantially transverse and preferably orthogonal with respect to the symmetry axis of the support group 18 and/or to the direction of movement of the column (and hence of the group 18) with respect to the base.

In substance, the support group 18 is such to support the tyre T at a first side F1 thereof and with a second side F2 or better yet the through hole TH delimited thereby facing towards the column 3 and hence towards the group 7 and/or 12 and is movable so as to move it close to-away from the column 3 and/or to lift it-lower it.

The machine can then be provided with buttons and/or pedals for activating the movements of the various components, more particularly of the above-described actuators.

In accordance with the present invention, a method is also provided for assembling (see in particular FIGS. 15 to 18) an annular element or support ring SR within a tyre T by means of an assembly machine 16 according to the present invention or in any case by means of an assembly device 1 associated, as stated above, with a machine provided with a support group 18.

According to such method, first the tyre T or better yet a first bead is mounted on a first side F1 of the tyre T on the support group 18 and a support ring SR is engaged by means of a grip and release group 7.

In order to do this, the grip and release group 7 is arranged within a support ring SR with the means for approaching and moving apart 9 in the second release position or at the same, and then the means for approaching and moving apart 9 are actuated so as to move the first 8a and the second 8b end apart, in a manner such to bring the first end 8a of the grip and release group 7 to wrap, from the inside, a respective portion of the ring SR, while the second end 8b is abutted, still from the inside, against another portion of the support ring SR.

The tyre T is instead blocked at a first side F1 by means of a support group, for example, if the support group 18 comprises claws 21, it is arranged with a first side F1 at the claws 21 in rest position, in a manner such that the claws 21 are within or better yet astride the first central hole (not illustrated in the figures) and at a respective portion of the first bead on the first side F1 of the tyre T delimiting such first hole. At this point, the actuation means 20 for the claws 21 are activated, moving them into the spread apart or angular displacement position, in which the claws 21 engage a respective portion of the first bead of the tyre T, i.e. portions of the first bead are housed within the gripping zones 21b of the claws 21.

The means for approaching and moving apart 9 are then again activated or they continue to be activated so as to further move apart the first 8a and the second 8b end, in a manner such to impart to the ring SR a substantially elongated or ellipsoidal configuration and hence by means of activation of the means for dislocating 5 the support arm 4 and/or of the means for angularly moving 6 the column 3, the insertion of the ring SR within the tyre T or better yet within the second central hole TH delimited by the second bead T2 on the second side F2 thereof is caused; during this step, one must take care to insert the support ring SR "lengthwise", i.e. the two long sides SR5 of the ellipsoidal support ring SR are placed substantially orthogonal to the second central hole TH and the narrow sides SR6 are placed substantially parallel to the second central hole TH.

During such step, the ring SR is tilted with respect to the rotation axis of the tyre and is then fully inserted in the tyre T or better yet in the inner channel IC between the two sides F1, F2 of the tyre, e.g. with a front part facing the bottom of the inner channel IC; in such a manner, also the tyre T is partly deformed, or better yet the second side F2 thereof, until a part of the ring SR has been inserted within the tyre T.

The above-described step can be conducted by activating only the means for dislocating 5 the support arm 4, hence maintaining the column 3 stopped with respect to the base 2, even if advantageously the assembly of the support ring SR is carried out by a combination of activation both of the dislocating means 5 and of the angular displacement means 6. More particularly, during such step, the column 3 is moved so as to move the grip and release group 7 close to the inner channel IC of the tyre T, while the arm 4 is lowered. Nevertheless, it will be understood that it could be necessary, during assembly, to carry out small backward adaptation movements of the column 3 or of the arm 4.

Preferably, during such step, the sliding of the support group 18 is also driven along the second column 17 and/or the sliding of the second column 17 with respect to the base 2. The support group 18 is first preferably moved close to the column and subsequently moved away, if desired also lowering or lifting it in accordance with the requirements.

In accordance therefore with a preferred version, an assembly method according to the present invention is conducted by means of combined activation of the dislocating means 5, of the angular displacement means 6, of the activating means 17a and of the sliding means 19. The movements to be imparted to the various means depend on the size and elasticity of the tyre and of the ring.

Before activating the dislocating means 5 and/or the angular displacement means 6, in order to facilitate the action of the latter it is possible to engage the tyre T by means of the tensioning means 11, e.g. by pulling the rope(s) or chain(s) 11a until respective portions of the tyre T or better yet of the second bead T2 on the second side F2 are coupled with respective constrain components 11b, in order to then activate the traction component 11c, so as to subject to tension and slightly enlarge, at the zone of action of the constrain components 11b, the second bead T2 of the tyre T.

Once the support ring SR has been partially inserted within the tyre T, it will be sufficient to move backwards the means for approaching and moving apart 9, so as to allow the ring SR to take again its own substantially "circular" rest configuration, so as to complete the insertion of the support ring within the tyre T. If desired, the insertion can be facilitated also in such step by means of the means for dislocating 5, for angularly moving 6, for activating 17a and/or for sliding 19.

Subsequently, the grip and release group 7 is extracted and, if provided, also the constrain components 11b must be removed from tyre T.

The support ring SR, the tyre T, the grip and release group 7 and/or the constrain components 11b can also be previously or during the assembly lubricated.

The expedient according to which the grip and release group 7 is articulated or pivoted to the arm 4 so as to be angularly movable as a function of the reaction force imparted to the grip and release group 7 by the support ring SR, ensures an angular movement of the ring SR such to be adapted during the assembly as a function of the configuration, of the elasticity and of the deformations imparted to the tyre T, so as to obtain a very quick assembling.

With regard instead to the expedient according to which the claws 21 define a zone of gripping or support facing upwards and towards the sides of the support group 18 as well as a free zone facing the bottom of the support group 18, this facilitates the insertion of the ring SR within the tyre, so that in the presence of a lower claw, this would obstruct the ring SR as well as the deformation of the tyre necessary for the assembly of the ring itself. Such expedient can also be an aid with the devices for treating a tyre different from the above-described assembly 1 or disassembly 12 devices.

According to the present invention a method is also provided for disassembling (see in particular FIGS. 19 and 20) an annular element or support ring SR from a tyre T by means of an assembly machine 16 according to the present invention or in any case by means of an assembly device 12 associated, as stated above, with a machine provided with a support group 18.

According to such method, the tyre T is first mounted on the support group 18, for example as described above with reference to the assembly method, with the tyre T in substantially vertical position, i.e. with rotation axis horizontal or slightly tilted with respect to the horizontal; at this point, the support ring SR, as a function of the weight thereof, is laid on its own lower portion and hence a space remains between the upper portion TU of the tyre T and the upper portion SRU of the support ring SR.

Then, the movement of the stem or inner part or first part 14a of the approach-move apart component 14 is driven until the belt component 15 is brought in proximity to such upper portion and then the upper portion of the support ring SR is wrapped by the belt component 15. At this point, the backward movement of the stem or inner part or first part 14a is driven, which drags the belt component 15 therewith and thus the support ring SR out of the inner channel IC of the tyre T.

During such step, advantageously, also the sliding of the support group 18 along the second column 17 and/or the sliding of the second column 17 with respect to the base 2 is driven, in particular in moving away from the extraction group.

If desired, instead of moving the stem or inner part or first part 14a of the approach-move apart component 14 or in combination with such solution, one could retain the support ring SR or better yet the upper portion SRU thereof by means of a belt or gripper and then move the support group 18, so as to move the tyre T away from the extraction group 13, thereby determining the exit of the ring from the tyre. In such case, the belt or gripper could be supported by a constrain component.

In addition, according to one variant, the grip and release group 7 can assist the extraction group 13 by pushing the support ring SR to exit from the inner channel IC of the tyre T.

Also in such case, the expedient according to which extraction group 13 is articulated or pivoted to the column 3, so as to be angularly movable as a function of the reaction force as stated above, ensures an angular displacement of the support ring SR such to be adapted during assembly as a function of the configuration, of the elasticity and of the deformations imparted to the tyre T, so as to obtain an effective and quick disassembly.

As will be understood, the devices and the machine according to the present invention allow mounting or dismounting a support ring SR into or from the inner channel IC of a tyre in a very simple and quick manner, hence allowing the execution of operations in an automatic and very fast manner—operations which are usually complicated and which require a lot of time for the execution thereof.

Modifications and variants of the invention are possible within the protective scope defined by the claims.

The invention claimed is:

1. A device for assembling a support ring within a tire comprising:
    a base;
    a column rising from said base;
    a support arm mounted on said column;
    a group for gripping and releasing a support ring, wherein said group for gripping and releasing is articulated to said support arm in order to be angularly movable with respect thereto, wherein said group for gripping and releasing comprises:
        two engagement ends for engaging respective portions within a central hole of said support ring; and
        an actuator for approaching and moving apart said engagement ends along a direction of elongation-shortening between a first engagement position, wherein said group is able to stretch the support ring along said direction so as to impart to said support ring a substantially elongated configuration, and a second release position for the support ring,
    wherein the device further comprises a tensioning apparatus configured to enlarge a central hole delimited by the tire in order to facilitate an insertion of the support ring, wherein said tensioning apparatus comprises at least one rope, at least one constrain component supported at a respective end of the rope, and a traction component of the rope.

2. The device for assembling according to claim 1, wherein said support arm is slidably mounted on said column and said device comprises means for dislocating said support arm along said column.

3. The device according to claim 1, wherein said column is pivotably connected to said base and said device comprises means for angularly moving said column around a pivot axis.

4. The device according to claim 1, wherein said group for gripping and releasing is articulated to said arm so as to be angularly movable, in use or during assembly of said support ring, with respect to said arm as a function of a reaction force imparted to said group for gripping and releasing by said support ring.

5. The device according to claim 4, wherein said group for gripping and releasing is articulated to said arm so as to be angularly movable, in use or during the assembly of said support ring, with respect to said arm as a function of the reaction force imparted to said group for gripping and releasing by said support ring, while driving or controlling the movement of said arm with respect to said column or of said column with respect to said base.

6. The device according to claim 1, wherein said two engagement ends of said group for gripping and releasing comprise a first end that is C-shaped or V-shaped and intended to be inserted and wrap from an inside of the support ring.

7. The device according to claim 6, wherein said first end has a bar component fixed to or integral with a component of the actuator for approaching and moving apart said engagement ends as well as a pair of plates, each fixed to a respective end of said bar component, so as to delimit therewith a cradle zone.

8. The device according to claim 7, wherein said first end comprises a guide rod slidably mounted within a hole delimited by a shelf component rising from said actuator.

9. The device according to claim 1, wherein said at least one constrain component comprises a sheet shaped so as to delimit a zone for the housing and sliding of a respective portion of a bead of the tire, and wherein the traction component comprises a winch.

10. The device according to claim 1, wherein each constrain component can be adjustably positioned with respect to said at least one rope.

11. A device for disassembling a support ring from a tire comprising:
a base;
a column rising from said base;
a group of extraction for extracting the support ring from the tire, said group of extraction comprising:
an actuator articulated to said column so as to be angularly movable with respect to said column, wherein said actuator comprises a constrain end; and
at least one belt component supported at the constrain end of said actuator and configured to be wrapped around or to enclose a portion of the support ring, so as to be able to drag the support ring out of an inner channel of the tire,
wherein said actuator comprises a stem, said stem being movable relative to a respective cylinder, said cylinder being articulated to said column and wherein said constrain end comprises a free end of said stem.

12. The device for disassembling according to claim 11, wherein said actuator is articulated to said column so as to be angularly movable, in use or during the disassembly of the support ring, with respect to said column as a function of a reaction force imparted to said belt component by said support ring and/or by said tire.

13. An assembly-disassembly unit comprising the device for assembling according to claim 1 and the device for disassembling according to claim 11, wherein said device for assembling and said device for disassembling share the same one base and the same one column and wherein said group of extraction is mounted on said column in a position above said group for gripping and releasing.

14. A machine for assembling and/or disassembling a support ring within and/or from a tire comprising a device according to claim 1 as well as a second column and a support group of said tire, said support group being slidably mounted on said second column and movable with respect thereto by means of a second actuator, said support group comprising at least one claw.

15. A machine for assembling and/or disassembling a support ring within and/or from a tire comprising a device according to claim 11 as well as a second column and a support group of said tire, said support group being slidably mounted on said second column and movable with respect thereto by means of a motor.

16. The machine according to claim 14, wherein said second column is slidably mounted on said base and movable with respect thereto by means of an activating actuator.

17. The machine according to claim 15, wherein said second column is slidably mounted on said base and movable with respect thereto by means of an activating actuator.

18. The machine according to claim 14, wherein said support group comprises at least one claw for engaging a bead of the tire, so as to define a zone of gripping or support of the tire facing upwards and towards sides of said support group and defining a free zone facing a bottom of said support group that is lacking claws.

19. The machine according to claim 15, wherein said support group comprises at least one claw for engaging a bead of the tire, so as to define a zone of gripping or support of the tire facing upwards and towards sides of said support group and defining a free zone facing a bottom of said support group that is lacking claws.

* * * * *